United States Patent [19]

Uchida et al.

[11] Patent Number: 5,785,075
[45] Date of Patent: Jul. 28, 1998

[54] FLUID-FLOW CONTROL VALVE

[75] Inventors: Yukio Uchida; Sachiko Nojyo, both of Kanagawa, Japan

[73] Assignee: Unisia JECS Corporation, Atsugi, Japan

[21] Appl. No.: 864,687

[22] Filed: May 28, 1997

[30] Foreign Application Priority Data

| May 28, 1996 | [JP] | Japan | 8-154753 |
| May 28, 1996 | [JP] | Japan | 8-154754 |
| May 28, 1996 | [JP] | Japan | 8-154755 |

[51] Int. Cl.$^6$ ............................................. G05D 7/01
[52] U.S. Cl. ................................. 137/115.1; 137/115.22
[58] Field of Search ........................ 137/115.1, 115.22

[56] References Cited

U.S. PATENT DOCUMENTS 4,768,540  9/1988  Mochizuki et al. ............. 137/115.1

FOREIGN PATENT DOCUMENTS 6-8840  1/1994  Japan.

*Primary Examiner*—Gerald A. Michalsky
*Attorney, Agent, or Firm*—Foley & Lardner

[57] ABSTRACT

A fluid-flow control valve device comprises a control orifice being fluidly disposed upstream of the outlet passage for variably restricting a flow of working fluid from the inlet passage to the outlet passage, a valve spool slidably accommodated in the spool chamber and defining first and second pressure chambers, and a control spring disposed in the second pressure chamber for biasing the valve spool toward the first pressure chamber, and a spring-bias adjustment device for variably adjusting a set spring-bias of the control spring associated the valve spool in response to a change in the pressure in the outlet passage.

10 Claims, 7 Drawing Sheets

FLUID-FLOW CONTROL VALVE

BACKGROUND OF THE INVENTION

1. Field of the Invention

The present invention relates to a flow control valve for suitably controlling a rate of flow of pressurized working fluid, produced by a hydraulic pump having a driven connection with a prime mover such as an automobile engine, and for feeding a controlled flow of working fluid into a hydraulic actuator such as a hydraulic power-steering device.

2. Description of the Prior Art

In typical hydraulic power-steering devices, which use hydraulic oil pressure from a fluid-pressure source to multiply the driver's steering effort (a steering torque manually applied to a steering shaft by the driver) as an aid in turning the steering wheel, an engine-driven oil pump is often used as a hydraulic pressure source. In hydraulic power steering devices, the driver supplies part of the steering effort, while the power assist part of the power steering device supplies the remaining steering effort required. As is generally known, the greatest steering effort is required as the steered road wheels are turned with the vehicle not moving or while parking, or during traveling at low speeds. In other words, most power assist is required during low engine revolutions. On the contrary, when the vehicle is traveling at high speeds, engine-driven power steering assist pump is also running fast. However, the load applied to the power steering unit (or the hydraulic actuator) is little, in other words, the mechanical-hydraulic resistive force (or the steering resistance at the steered road wheels) of the steering linkage and tires of the steered road wheels on the road, is little, during high-speed driving for example at high-way speeds or at cruising speeds, as compared with during low-speed driving or during idling. That is to say, when the pump speeds are fast with the engine running at high speeds, little or no power assist is required from the viewpoint of a steering stability. To compensate for high pump volumes at high engine revolution speeds, the power steering device usually employs a fluid-flow control valve which is fluidly connected between the pump and the steering-gear high pressure hose. In order to give the required power assist, the conventional flow control valve is designed to increase the pump flow to the maximum required flow rate during idling or with the engine running at low speeds, and to restrict the pump flow to a controlled flow rate through orifice constriction and also to return the remainder oil, which is obtained by subtraction of the required flow rate from the pump flow rate, to the reservoir when the engine speed increases from idle and then reaches a specified engine speed. In recent years, there have been proposed and developed another types of power steering systems which are capable of reducing the pump power requirement and fulfilling energy saving by effectively reducing the flow rate of working fluid fed to the high pressure hose of the power steering device, increasing the flow rate of the remainder working fluid, during neutral, straight-ahead, operation in which little or no power assist is required. One such fluid-flow control valve suitable for a hydraulic power steering device has been disclosed in Japanese Patent Provisional Publication No. 6-8840. The prior art flow control valve disclosed in the Japanese Patent Provisional Publication No. 6-8840 uses at least two spool valves fluidly disposed between the outlet port of the pump and the high-pressure hose of the power steering assembly containing a power cylinder and a rotary valve. A first valve of the above-mentioned spool valves functions like a pilot-actuating type pressure reducing valve and has a sliding spool being slidably accommodated in a cylindrical spool chamber to define first and second pressure chambers. The first chamber is equipped with an inlet port through which a portion of the pressurized working fluid from the pump outlet is introduced into the first valve, and with a flow restricting type drain port, the flow rate through which is restricted depending on the axial position of the spool of the first valve. A return spring is operably disposed in the second pressure chamber. The second pressure chamber is equipped with a pilot port communicating via an orifice with the discharge passage connected to the pump outlet. The axial position of the spool of the first valve is thus determined depending on the pressure differential on both end faces of the spool of the first valve and the bias of the return spring in the second chamber. On the other hand, the second valve serves as a bypass valve which is sensitive to the pressure in the discharge passage. The bypass valve (the second spool valve) also includes a spool chamber and a sliding spool slidably accommodated therein to divide the spool chamber into first and second pressure chambers. The first pressure chamber of the bypass valve is connected via an orifice to the discharge passage, whereas the second pressure chamber of the bypass valve is equipped with two ports, namely one port being connected to the pilot port of the first spool valve and the other port being connected to a return line (or to the reservoir). A return spring is also disposed in the second pressure chamber of the bypass valve. In case of the prior art control valve disclosed in the Japanese Patent Provisional Publication No. 6-8840, when the pressure in the discharge passage connected to the pump outlet port drops under a condition in which the steering wheel is in neutral and the power steering unit does not work, the spool of the bypass valve moves toward its spring-loaded position and thus the pilot port of the second chamber of the first spool valve is communicated with the low pressure side (the reservoir) via the orifice through the two ports which are exposed to the second chamber of the bypass valve. This forces the spool of the first valve to move towards a position opposite to the spring-loaded position and keeps the size of the return passage opening of the drain port of the first valve at the maximum. That is, the drain port of the first valve is kept fully opened. As a result, the amount of working fluid supplied to the power steering high-pressure hose is effectively reduced. In this manner, the first spool valve and the bypass valve are cooperative with each other to feed the required flow to the power steering unit and to return the remainder flow to the reservoir. However, in the prior art flow control valve, the restricting orifices are fluidly disposed in the discharge passage, and in a connection line between the discharge passage of the pressurized working fluid and the pilot port of the second pressure chamber of the first spool valve and in a connection line between the pilot port and the bypass valve, for producing the desired pressure differential on both end faces of the respective spool for the axial motion of each spool. When the second pressure chamber of the first valve is communicated with the low pressure side (the reservoir) by means of the bypass valve (the second spool valve), the pressurized working fluid from the pump is drained necessarily via the restricting orifice through the bypass valve to the reservoir. In other words, even when the power steering unit does not work with the steering wheel held in neutral and the steered road wheels being straight ahead and thus the load (the mechanical-hydraulic resistive force) applied to the power steering unit is excessively low, a portion of the working fluid from the pump must always pass through the metering or restricting orifice having a specified flow resistance, experiencing a pressure drop (or orifice constriction). This induces a waste of pump workload, and thus energy saving cannot be fulfilled satisfactorily. In addition, the prior art flow control valve device functions to control the rate of flow of the pressurized working fluid from the pump to the actuator (the power steering unit), depending on the pressure in the discharge passage (i.e., the pressure in the pump outlet), being in correlation with the load (hydraulic pressure) applied to the actuator. When the load applied to the actuator is little (the pressure in the discharge passage) is low, the flow of working fluid fed to the actuator may be unintendedly constricted by the orifice. Under a particular condition in which the resistive force (the steering resistance at the steered wheels) of tires of the steered wheels on the road is little for instance during driving on so-called low-μ roads such as icy, snow or wet roads and thus the load applied to the actuator is little, if the steering wheel is greatly turned, there is another problem of lack of flow-rate, resulting from the orifice constriction (pressure loss). To avoid this, the discharge pressure of the pump must be set at a somewhat higher pressure level in consideration of the pressure loss caused by the orifice for the purpose of ensuring the minimum required flow rate of working fluid even when the load applied to the actuator is low. This reduces the effect of energy saving to half.

SUMMARY OF THE INVENTION

Accordingly, it is an object of the invention to provide a fluid-flow control valve which avoids the aforementioned disadvantages of the prior art.

It is another object of the invention to provide a flow control valve, which adequately fulfills the energy-saving effect, suppressing wasteful energy loss of a hydraulic pump, when a hydraulic actuator such as a power steering unit does not work and the required working-fluid pressure is low.

It is a further object of the invention to provide a flow control valve, which can effectively supply an adequate flow rate of working fluid to a hydraulic actuator (a power steering unit) even when the load applied to the actuator (the hydraulic pressure applied upon pressure surfaces of the actuator) is low.

In order to accomplish the aforementioned and other objects of the present invention, a fluid-flow control valve device comprises a spool chamber, an outlet passage being adapted to fluidly connected to an inlet port of an hydraulic actuator, an inlet passage being adapted to fluidly connected to a pump outlet, a drain passage being adapted to be fluidly connected to a reservoir, a control orifice being fluidly disposed upstream of the outlet passage for variably restricting a flow of working fluid from the inlet passage to the outlet passage, a valve spool slidably accommodated in the spool chamber and defining a first pressure chamber and a second pressure chamber in cooperation with an inner peripheral wall of the spool chamber, the first pressure chamber to which the inlet passage and the drain passage open to communicate the inlet passage with the outlet passage via the control orifice and to control a size of drain-passage opening in conjunction with one end of the valve spool, and the second pressure chamber into which a pressure in the outlet passage is introduced, a control spring disposed in the second pressure chamber for biasing the valve spool toward the first pressure chamber; the control spring being in cooperation with the valve spool and the control orifice, to feed a required flow rate of working fluid from the inlet passage via the control orifice to the outlet passage and to return a remainder working fluid to the drain passage, the control orifice consisting of a main fixed orifice and a sub-orifice being arranged parallel to the main fixed orifice, the sub-orifice being responsive to a pressure in the first pressure chamber to variably meter an opening size of the sub-orifice, and spring-bias adjustment means for variably adjusting a set spring-bias of the control spring associated the valve spool in response to a change in the pressure in the outlet passage.

DESCRIPTION OF THE PREFERRED EMBODIMENTS

First Embodiment

Figure 1:
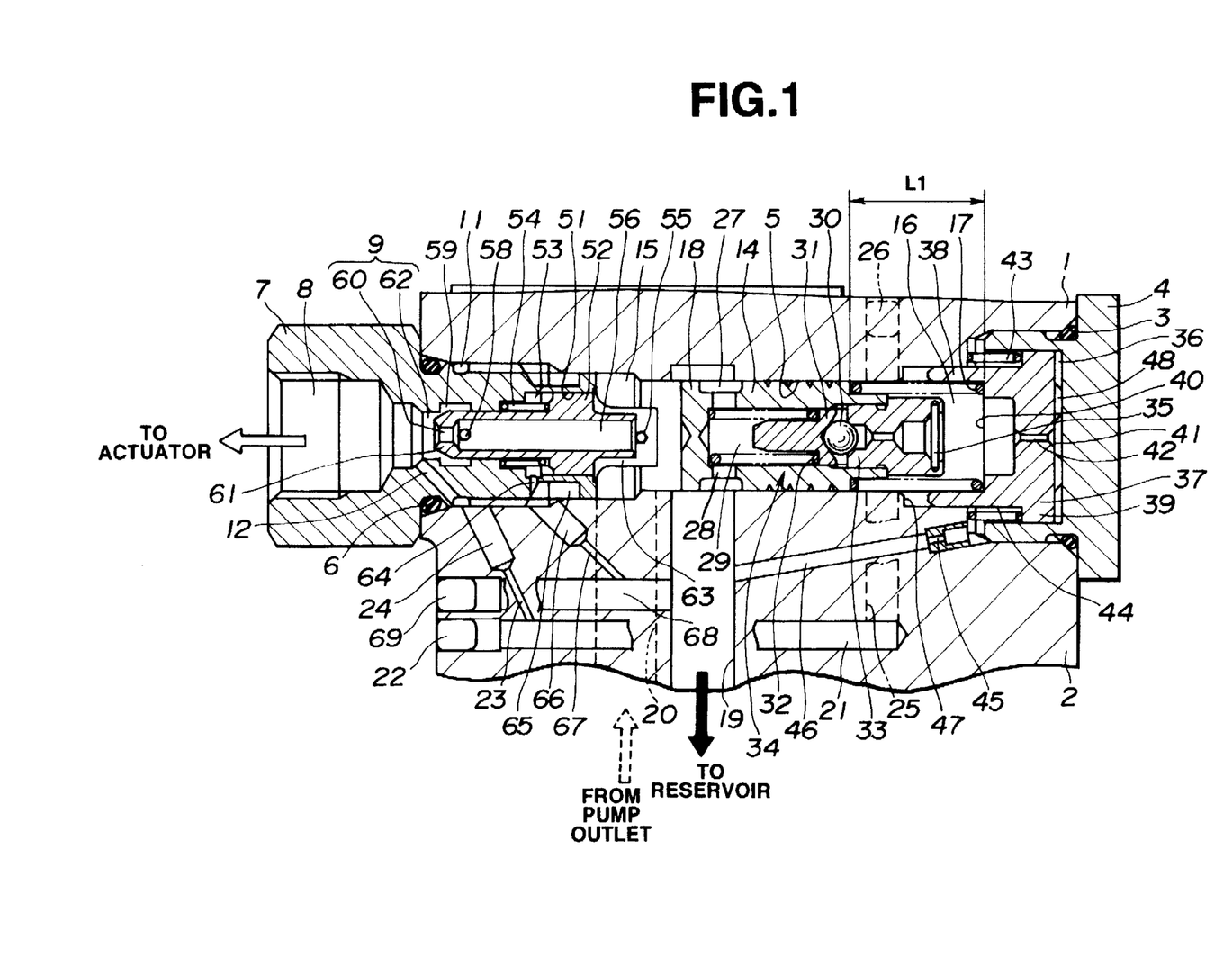
FIG. 1 is a longitudinal cross-sectional view illustrating a first embodiment of a flow control valve device of the invention.

Referring now to the drawings, particularly to FIG. 1, the fluid-flow control valve of the invention is exemplified in case of a flow control valve for power steering fluid (working fluid) flowing through an automobile hydraulic power steering device. As seen in FIG. 1, a control valve housing 1 is integrally formed with a pump body 2. An essentially cylindrical valve spool chamber 5 is formed in the valve housing 1. One opening end of the spool chamber 5 is sealed in a fluid tight fashion by means of a plug 4 with a seal ring 3 such as an O ring. A connector 7 is threadably connected to the other opening end of the spool chamber 5. The connector 7 is equipped with a seal ring on its outer periphery to provide tight seal and thus prevent oil leakage. A sliding valve spool 14 is slidably accommodated in the spool chamber 5, and defines a first pressure chamber 15 and a second pressure chamber 16 in conjunction with the inner peripheral wall of the spool chamber 5. The spool 14 is permanently biased toward the first pressure chamber 15 (leftward viewing FIG. 1) by means of the bias of a control spring 17 which is operably disposed in the second pressure chamber 16. With the spool shifted to the leftmost position, the valve-spool left end (including the land 18) acts to reduce the opening of a drain passage (or a return passage) 19, which is connected to a reservoir (not shown), to the minimum (e.g., zero). An inlet passage 20 is fluidly connected to the first pressure chamber 15 to feed the pressurized working fluid discharged from the pump into the first pressure chamber 15. The left-hand large-diameter portion of the previously-noted connector 7 is formed with a large-diameter axially-extending outlet passage 8, communicating with a power steering unit, i.e., a hydraulic actuator. On the other hand, the right-hand small-diameter portion of the connector 7 is formed with an axially-extending small-diameter stepped bore 51 through which the outlet passage 8 is communicated with the first pressure chamber 15. A substantially cylindrical-hollow, stepped sub-spool valve 52. A low-pressure chamber 53 is defined between the outer periphery of the small-diameter portion of the sub-spool valve 52 and the inner peripheral wall of the stepped bore 51. A return spring 54 is disposed in the low-pressure chamber 53 to bias the sub-spool valve 52 towards the first pressure chamber 15. The rightmost movement of the sub-spool valve 52 is limited by means of a stopper pin 55 fixed to the connector 7. The connector 7 is formed with two circumferentially-extending annular grooves 11 and 65 on its outer periphery. The connector 7 is formed in the inner peripheral wall of the stepped bore 51 with a circumferentially-extending annular groove 59. The connector 7 is formed with an oblique through-opening 12 opening to the bottom face of the annular groove 11 to communicate the groove 11 with the outlet passage 8. The connector 7 is formed with a cut-out portion 63 which is exposed to the inlet passage 20 and faces to the first pressure chamber 15. The connector 7 is also formed with a radial bore 64 through which the low-pressure chamber 53 is communicated with the annular groove 65. The low-pressure chamber 53 also communicates with the drain passage 19 through an oblique bore 66 (formed in the valve housing 1), a pressure-sensitive orifice 67, and a fluid passage 68. The left-hand opening end of the passage 68 is tightly sealed with a plug 69, whereas the right-hand opening end of the passage 68 opens to the drain passage 19. The passage 68 is bored in the valve housing 1 in such a manner as to pass through the drain passage 19. The sub-spool valve 52 is formed with an axial fluid passage 56 communicating the first pressure chamber 15. The axial passage 56 communicates with the inside annular groove 59 through a radial through-opening 58. The right-hand end of the sub-spool valve 52, facing the outlet passage 8 of the connector 7, is formed with an axially-extending flow-restricting main orifice 60 communicating the axial passage 56. The outer peripheral surface 61 of the right-hand end of the sub-spool valve 52 is tapered toward the outlet passage 8. The tapered surface 61 and the shoulder portion of the inner annular groove 59 of the connector 7 defines a sub-orifice passageway 62 serving as a variable orifice. As seen in FIG. 1, the sub-orifice passageway 62 is arranged in parallel with the main orifice 60. The main orifice 60 and the sub-orifice 62 constructs a control orifice 9 to control or to meter the rate of fluid flow introduced into the outlet passage 8. The valve housing 1 is formed with another fluid passage 21 extending essentially parallel to the axially-extending spool chamber 5. One end (the right-hand end) of the fluid passage 21 is formed as a closed end, while the other end (left-hand end) of the passage 21 is an opening end which is tightly sealed by way of a plug 22 when assembling. The left-hand side of the passage 21 communicates with the outer annular groove 11 of the connector 7 through a pressure-sensitive orifice 23 and an oblique bore 24, whereas the right-hand side of the passage 21 communicates with the second pressure chamber 16 through a radial passage 25 formed in the housing 1. The radial passage 25 is radially bored in a manner so as to pass through the second pressure chamber 16. The upper opening end of the radial passage 25 is tightly closed by a plug 26.

The sliding spool 14 is in its outer periphery with a circumferentially-extending annular groove 27 facing the drain passage or the return passage 19. The spool 14 is formed with a radial through-opening 28 opening to the bottom face of the annular groove 27. The spool 14 is also formed therein with an axial bore 29 extending toward the second pressure chamber 16 and communicating with the radial through-opening 28. A pressure relief valve 34 is provided in the axial bore 29 of the spool 14. The pressure relief valve 34 consists of a check-ball valve 30, a ball-valve pusher 31, a check spring 32 and a substantially cylindrical-hollow plug 33 with an axially-extending central bore. As may be appreciated, when the controlled pressure in the outlet passage 8 is a normal pressure level but not excessive, the ball valve 30 is biased toward the left valve seat of the plug 33 by means of the bias of the spring 32, thus normally closing the left-hand opening end of the central bore of the plug 33 and blocking fluid communication between the second pressure chamber 16 and the drain passage 19. In the event that the pressure in the outlet passage 8 rises greatly and reaches a predetermined point, the ball valve 30 of the relief valve axially moves leftwards to open an intermediate passage between the outlet passage 8 and the drain passage (the return passage) 19 to limit the controlled pressure in the outlet passage to a safe value and to avoid damage to the power steering unit seals, hoses or the like. Reference sign 35 denotes an oil filter.

Reference sign 37 denotes a movable spring-seat member whose right-hand flat end face 41 defines a control pressure chamber 36 in conjunction with the inner periphery of the plug 4. The left-hand cylindrical-hollow portion of the movable spring-seat member 37 defines the second pressure chamber 16 in conjunction with the right-hand end of the spool 14 (precisely the plug 33). The movable spring-seat member 37 is disposed between the second pressure chamber 16 and the control pressure chamber 36 and consists of a cylindrical-hollow portion 38 and a comparatively large-diameter flanged portion 39. The cylindrical-hollow portion 38 is slidably fitted to the inner peripheral wall of the second pressure chamber 16. One stepped end face 40, formed integral with the cylindrical-hollow portion 38, faces the second pressure chamber 16 and serves as a spring seat for the fluid-flow control spring 17. On the other hand, the flanged portion 39 is slidably fitted to the inner peripheral wall of the control pressure chamber 36. The flat end face 41 of the flanged portion 39 faces the control pressure chamber 36 and has a diameter greater than that of the stepped end face 40. The movable spring-seat member 37 is formed with an axial central through-opening 42 through which the second pressure chamber 16 is communicated with the control pressure chamber 36, to direct the pressure in the chamber 16 through the through-opening 42 to the chamber 36. A return-spring chamber 44 is defined between the left-hand annular end face of the flanged portion 39 and the shoulder portion of the valve housing 1. A return spring 43 is disposed in the return-spring chamber 44 to bias the movable spring-seat member 37 toward the control pressure chamber 36. The return-spring chamber 44 communicates with the drain passage 19 through a pressure-sensitive orifice 45 and an oblique bore 46. The axial leftmost movement of the movable spring-seat member 37 is limited by way of abutment between the leftmost end of the cylindrical-hollow portion 38 and a stepped portion 47 formed in the inner peripheral wall of the second pressure chamber 16. The axial rightmost movement of the movable spring-seat member 37 is limited by way of abutment between the slightly raised portion 48 integrally formed with the flanged portion 39 and the inside wall surface of the plug 4.

With the previously-described arrangement, the pressurized working fluid, discharged from the pump outlet, is drawn through the inlet passage 20, the first pressure chamber 15, the axial bore 56 of the sub-spool 52, and the control orifice 9 composed of the main orifice 60 and the sub-orifice 62, into the outlet passage 8. Roughly speaking, when the power steering unit works normally with the pump running at comparatively low speeds, the valve spool 14 is biased toward the first pressure chamber 15 by way of the bias of the control spring 17, with the result that the drain passage 19 is closed mainly by the land 18 and most of the working fluid in the first pressure chamber 15 is fed through the control orifice 9 to the hydraulic actuator such as the power steering unit (not shown). As the pump speed increases, the discharge amount of pressurized working fluid from the pump increases gradually. As the amount of working fluid entering the first pressure chamber 15 increases with the increased discharge of the pump, the pressure drop difference across the control orifice 9 increases. Thus, the working fluid, entering the first pressure chamber 15, passes through the control orifice 9, experiencing a pressure drop, and then is fed into the outlet passage 8. The control orifice 9 serves as a differential pressure producer as well as a metering orifice, and as a result the spool 14 axially moves rightwards (viewing FIG. 1) in response to the pressure differential across the control orifice 9. The rightward movement of the fluid-flow control orifice 9 increases the size of the return-passage opening, thereby permitting the remainder working fluid to effectively return through the drain passage 19 to the reservoir and consequently ensuring a steering stability during high engine speeds. In the flow control valve device of the present invention, note that the control spring 17, which contributes to an axial position control of the spool 14, permanently abuts the movable spring-seat member 37 with the return spring 43 on its outer periphery and with two pressure-receiving surfaces, namely the stepped end face 40 facing the second pressure chamber 16 and the flatted end face 41 facing the control pressure chamber 36 and having a greater diameter than that of the stepped end face 40. When the pressure in the control pressure chamber 36 (being equivalent to the pressure in the second pressure chamber 16 communicating with the outlet passage 8 through the fluid passageways 12, 24, 23, 21, and 25) is low, the movable spring-seat member 37 is held by way of the bias of the return spring 43 at its rightmost position. At the rightmost position, the slightly raised portion 48a abuts the inside wall surface of the plug 4 and thus the volumetric capacity of the second pressure chamber 16 is increased to the maximum and the volumetric capacity of the control pressure chamber 36 is reduced to the minimum and as a result the axial length of the control spring 17 becomes a predetermined setting length L1 (see FIG. 1). A set spring-bias of the control spring 17, disposed between the spool 14 and the movable spring-seat member 37, becomes small. Conversely, when the pressure in the control pressure chamber 36 is high, the movable spring-seat member 37 shifts against the bias of the spring 43 toward its leftmost position in which the leftmost end of the cylindrical-hollow portion 38 abuts the stepped portion 47 of the housing 1 and the volumetric capacity of the second pressure chamber 16 is reduced to the minimum and the volumetric capacity of the control pressure chamber 36 is increased to the maximum and as a result a set spring-bias of the control spring 17 becomes greater due to a length L2 (see FIG. 2) shorter than the predetermined setting length L1.

Figure 3:
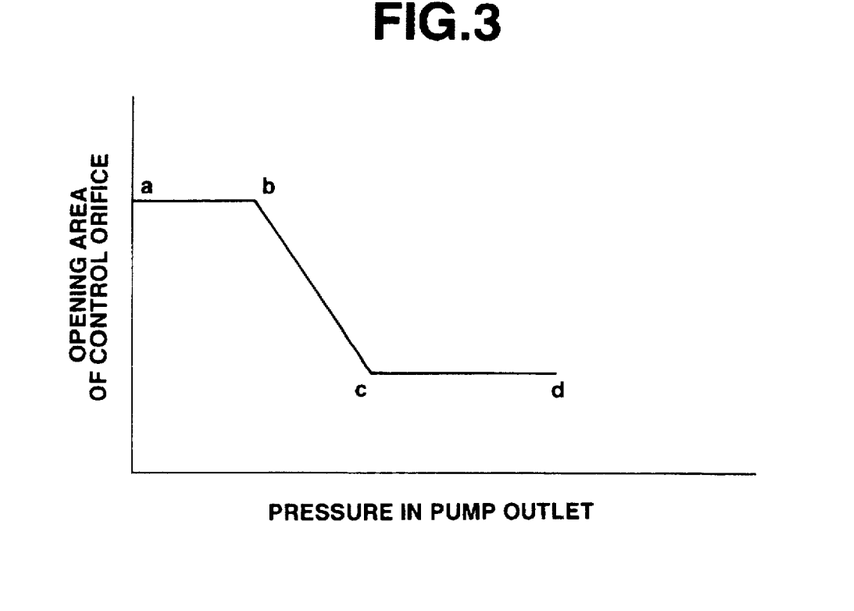
FIG. 3 is a graph showing the relationship between the pump-outlet pressure and the opening area of the control orifice.
Figure 4:
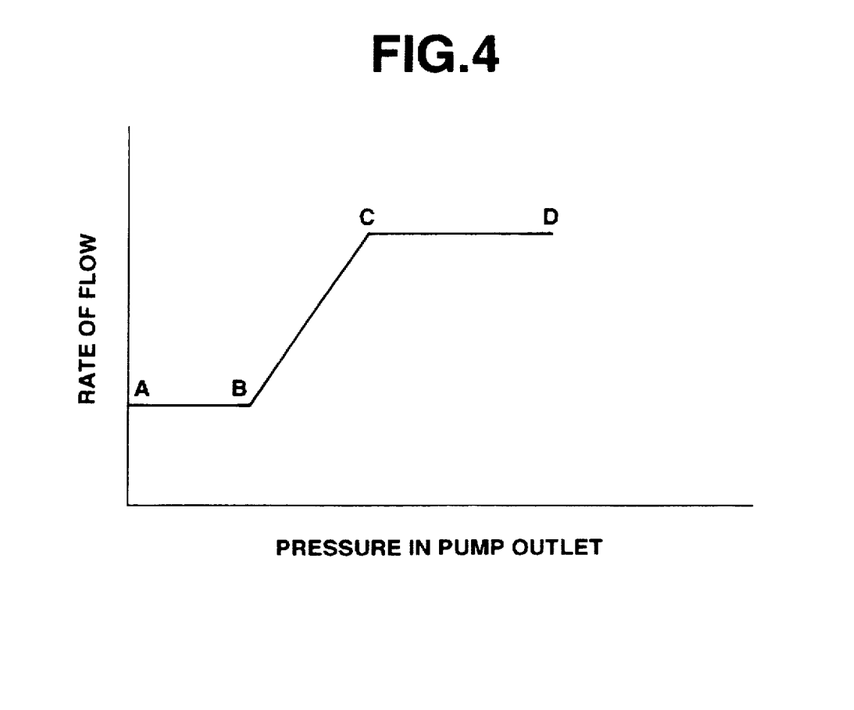
FIG. 4 is a graph showing the flow-control characteristics of the flow control valve device of the embodiments.

Referring now to FIGS. 3 and 4, there are shown the pump-outlet pressure versus control-orifice opening area characteristic and the pump-outlet pressure versus controlled rate-of-flow characteristic. The operation of the fluid-flow control valve device of the embodiment will be hereinafter described in detail in accordance with the characteristics of FIGS. 3 and 4.

For example if the hydraulic actuator (the power steering unit) does not work with the steering wheel in neutral, the pressure in the outlet passage 8 is usually low and then the pressure in the control pressure chamber 36 is held at a low level. The movable spring-seat member 37 is held at the rightmost position and as a result the set spring-bias of the control spring 17 is weakened so much. Under the inoperative state of the hydraulic actuator, in the case that the pressure in the outlet passage 8 is low, the pressure of working fluid discharged from the pump to the inlet passage 20 (that is, the pump-outlet pressure) becomes low. Therefore, the pressure in the first pressure chamber 15 becomes essentially equal to the pressure in the drain passage 19. The sub-spool valve 52 moves toward its rightmost position by way of the bias of the spring 54 as shown in FIG. 1, in which the size of the opening of the sub-orifice 62 is held at the maximum value, in other words the size of the control-orifice opening becomes increased to the maximum as illustrated by the line segment a–b of FIG. 3. Under this condition, the axial position of the spool 14 is controlled by means of the control spring 17 of the comparatively small set spring-bias. With the maximum size of the control-orifice opening, the flow rate of the working fluid passing through the control orifice 9 is controlled as illustrated in the line segment A–B of FIG. 4. In the case that the pressure in the pump outlet is comparatively low, the rate-of-flow of the working fluid flowing through the control orifice 9 into the outlet passage 8 is held at a predetermined first flow rate, since the pressure in the outlet passage 8 is low and thus the pressure in the discharge side of the pump is low and additionally the orifice constriction (orifice restriction) is smallest with the maximum orifice-opening size.

As the pressure in the outlet passage 8 increases and thus the pressure in the control pressure chamber 36 rises gradually, the movable spring-seat member 37 gradually moves toward the second pressure chamber 16 against the bias of the return spring 43 by virtue of the pressure rise in the control pressure chamber 36. As a result the control spring 17 contracts gradually in accordance with the rise of pressure in the control pressure chamber 36, thereby producing an increased set spring-bias. At the same time, when the pressure in the outlet passage 8 rises, the pressure of working fluid discharged from the pump to the inlet passage 20 (that is, the pump-outlet pressure) becomes high. The pressure differential between the pressure upon the pressure-receiving surface of the sub-spool valve 52 facing the first spool chamber 15 and the pressure upon the pressure-receiving surface of the sub-spool valve 52 facing the low-pressure chamber 53 becomes greater. As a result, the sub-spool valve 52 axially shifts leftwards against the bias of the spring 54. The leftward movement of the sub-spool valve 52 gradually reduces the size of the sub-orifice opening to increase the effect (the orifice constriction) of the variable sub-orifice 62 essentially in a linear fashion. As a whole, the size of the control-orifice opening is gradually reduced to the minimum. The line segment b–c of FIG. 3 clearly shows the linear reduction of the size of the orifice opening. In the previously-discussed transiently shifting state of the sub-spool valve 52, the sliding spool 14 is controlled depending on a somewhat greater spring bias of the control spring 17 and the pressure differential across the control orifice 9 whose opening size is somewhat metered. As a consequence, the flow rate of the working fluid passing through the control orifice 9 varies as illustrated in the line segment B–C of FIG. 4.

As soon as the pressure in the outlet passage 8 further increases and then reaches a predetermined point, and thus the pressure in the control pressure chamber 36 also reaches to a predetermined pressure level, the movable spring-seat member 37 moves towards the leftmost position until the leftmost end of the cylindrical-hollow portion 38 abuts the stepped portion 47 (serving as a stopper) formed in the inner peripheral wall of the second pressure chamber 16. With the movable spring-seat member 37 held at the leftmost position, the axial length of the control spring 17 is reduced to the length L2 (see FIG. 2), thereby changing the set spring-bias of the control spring 17 to the greater value. As previously discussed, when the pressure of the working fluid discharged from the pump outlet to the inlet passage 20 reaches the predetermined point, the sub-orifice opening is fully closed and thus the opening size of the control orifice 9 actually becomes equal to the opening size of the main orifice 60. That is, the size of the control-orifice opening becomes reduced to the minimum size, as indicated by the line segment c–d of FIG. 3. Therefore, under the pressure in the outlet passage 8 higher than the predetermined point, the spool 14 performs the fluid-flow control operation in response to both the pressure differential across the control orifice 9 adjusted to the minimum opening size and the bias of the control spring 17 whose set pressure is maintained at the great set value. Under such high pressure in the outlet passage 8, the flow rate of the working fluid flowing through the control orifice 9 is kept at a predetermined second flow rate (the predetermined maximum rate) as indicated by the line segment C–D of FIG. 4. As may be appreciated, the predetermined maximum flow rate of the flow control valve of the embodiment is determined depending on the axial position of the movable spring-seat member 37. It will be understood that the maximum flow rate of the flow control valve can be adjusted by varying the stopped position or abutted position (i.e., the stepped portion 47) with respect to the leftmost end of the cylindrical-hollow portion 38.

In the event that the hydraulic actuator (the power steering unit) shifts from the previously-noted operative state to the inoperative state in which the hydraulic actuator does not work with the steering wheel kept in neutral and the steered road wheels kept straight ahead, the pressure in the outlet passage 8 drops. In case of a pressure drop in the outlet passage 8, the flow control valve device of the embodiment functions to maintain the pressure differential across the control orifice 9 constant, by shifting the spool 14 toward the second pressure chamber 16 against the spring bias and consequently increasing the size of the drain-passage opening. This permits a large amount of the incoming working fluid into the first pressure chamber 15 to flow through the drain passage 19. As a result, the pressure in the pump outlet drops rapidly and therefore the workload of the pump can be effectively reduced. At the same time, owing to the pressure drop in the outlet passage 8, the pressure in the control pressure chamber 36 also becomes lowered, since the control pressure chamber 36 communicates with the outlet passage 8 via the plural passages formed in the housing 1. This forces the movable spring-seat member 37 to shifts to its rightmost position by means of the bias of the return spring 43 until the raised portion 48 abuts the inside wall surface of the plug 4. When the rightward movement of the movable spring-seat member 37 is stopped by abutment between the two members 4 and 37, the length of the control spring 17 is set at the greater length L1 as seen in FIG. 1. The valve spool 14 is balanced between the pressure differential across the control orifice 9 (that is, the pressure differential between the pressure in the first pressure chamber 15 and the pressure in the second pressure chamber 16) and the bias of the control spring 17. Owing to decrease in the bias of the control spring 17 based on the amount of the axial rightward displacement of the movable spring-seat member 37, the spool 14 further moves towards the second pressure chamber 16, thereby resulting in an increased size of the drain-passage opening. The working fluid fed into the first pressure chamber 15 can be effectively rapidly returned to the pump inlet port (not shown) or to the reservoir through the drain passage 19 of the increased opening area, when the hydraulic actuator is in the inoperative state and thus little or no flow rate of working fluid is required. As set forth above, in the case that the hydraulic unit does not work for example with the steering wheel held in neutral, more of the working fluid introduced through the inlet passage 20 into the first pressure chamber 15 is smoothly rapidly returned to the reservoir via the drain passage 19 adequately opened with almost no restriction, with the result that the pressure in the outlet port side of the pump rapidly drops and the workload of the pump is effectively reduced. This achieves satisfactory energy saving.

As discussed above, when the hydraulic actuator does not work, the movable spring-seat member 37 is balanced between the bias of the return spring 43 (loosely fitted onto the outer periphery of the movable spring-seat member 37) and the pressure in the control pressure chamber 36. The movable spring-seat member 37 is responsive to the pressure drop in the control pressure chamber 36 to variably adjust the set spring-bias of the control spring 17 which acts on the spool 14. Also, for the purpose of producing the axial movement of the movable spring-seat member 37, the pressure in the second pressure chamber 16 is drawn into the control pressure chamber 36 and additionally there is the specified difference between the two pressure-receiving surface areas 40 and 41, respectively facing the second pressure chamber 16 and the control pressure chamber 36. The flow control valve device of the first embodiment is designed so that a portion of the working fluid discharged from the pump never passes through the control orifice 9 for the axial movement of the movable spring-seat member 37, associated with the spool 14 via the control spring 17. That is to say, the discharge pressure of the pump can be set at a relatively low level as compared with the prior art. This suppresses wasteful energy consumption of the pump and ensures satisfactory energy saving. Furthermore, in the shown embodiment, since the control orifice is composed of the main orifice 60 (a fixed orifice) and the sub-orifice passageway 62 (a variable orifice) and the sub-orifice 62 is responsive to the pressure in the first pressure chamber 15 or the pressure drawn into the inlet passage 20 (correlated with the load applied to the hydraulic actuator or the pressure in the outlet passage 8), so as to decrease the size of the control-orifice opening in accordance with the increase in the pressure in the first pressure chamber 15. As seen in FIG. 3, the control orifice 9 is designed so that the area of the opening of the orifice 9 is adjusted to the greatest value and the orifice restriction is effectively reduced to the minimum when the pressure in the outlet passage 8 is low. This permits a proper flow rate required for the hydraulic actuator.

Figure 2:
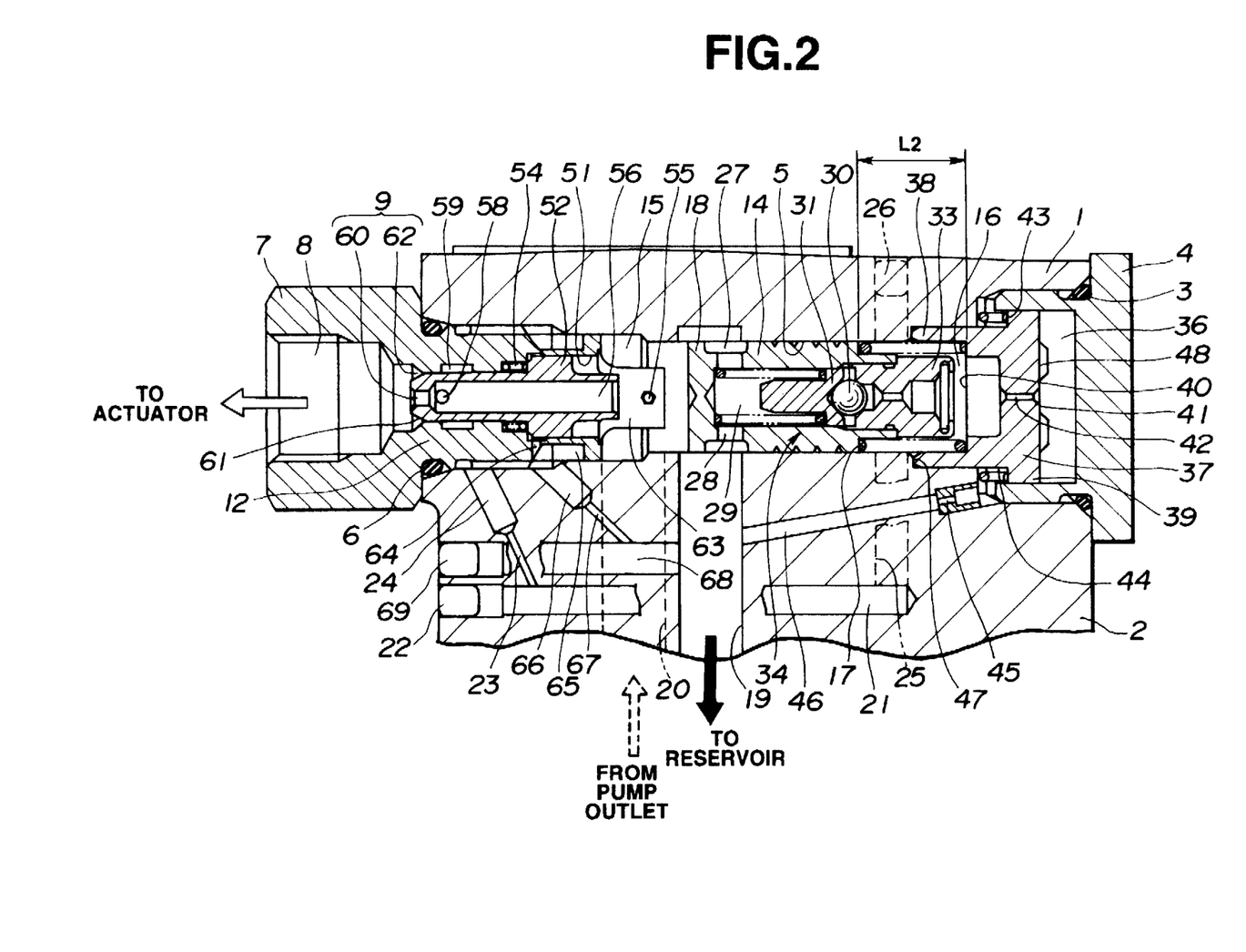
FIG. 2 is a longitudinal cross-sectional view illustrating the flow control valve of the first embodiment under a condition in which the movable spring-seat member is in close proximity to the second pressure chamber under high pressure in the pump outlet.

In the first embodiment, the control pressure chamber 36 is coaxially aligned with the spool chamber as seen in FIGS. 1 and 2. In radial cross-section, the valve housing 1 and the flow control valve assembly can be small-sized. In the first embodiment, although the communication passage (the axial through-opening 42) intercommunicating the second pressure chamber 16 and the control pressure chamber 36 is formed in the movable spring-seat member 37, the communication passage may be formed in the valve housing 1 for fluid-communication between the two chambers 16 and 36.

Second Embodiment

Figure 5:
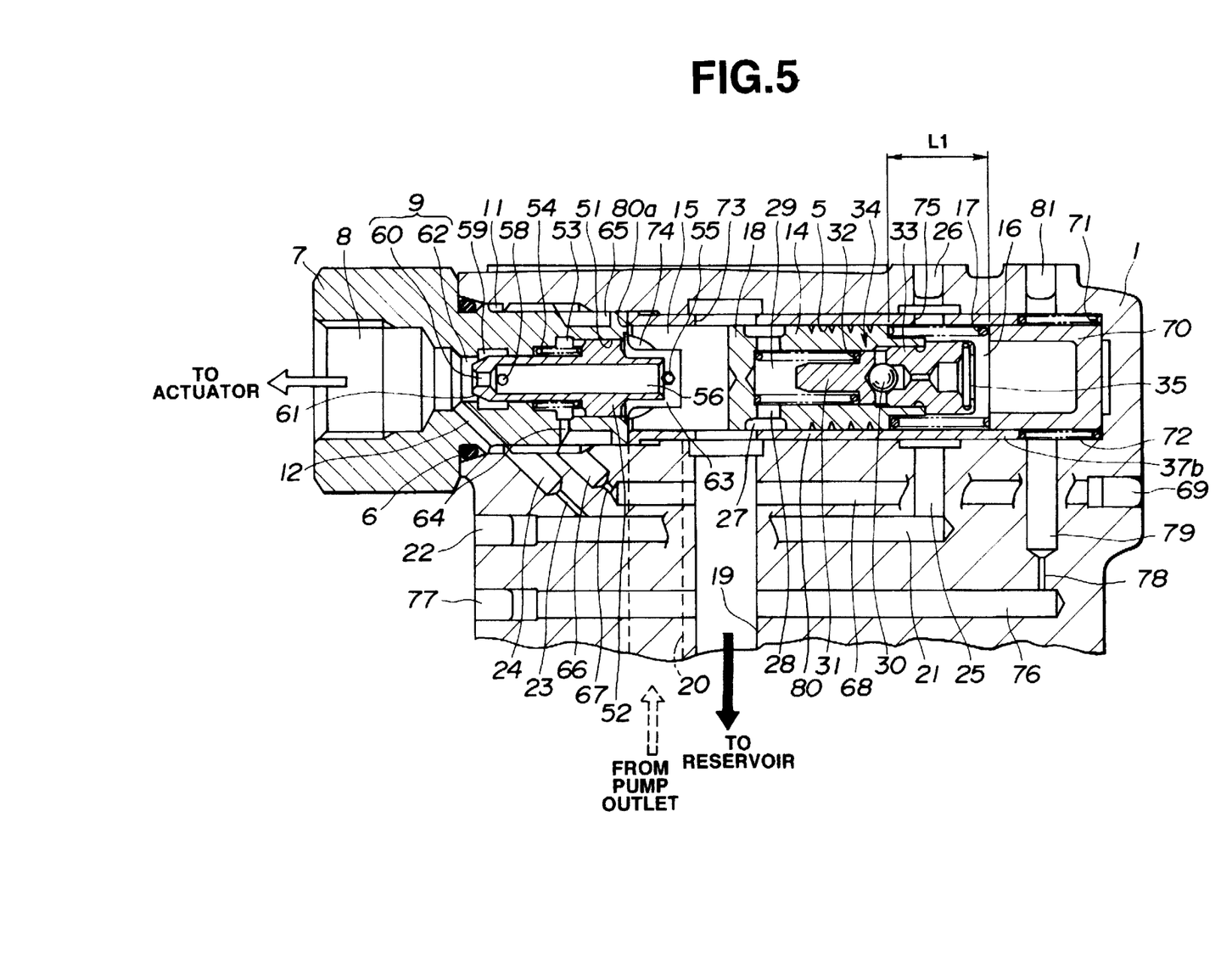
FIG. 5 is a longitudinal cross-sectional view illustrating a second embodiment of the flow control valve device of the invention.
Figure 6:
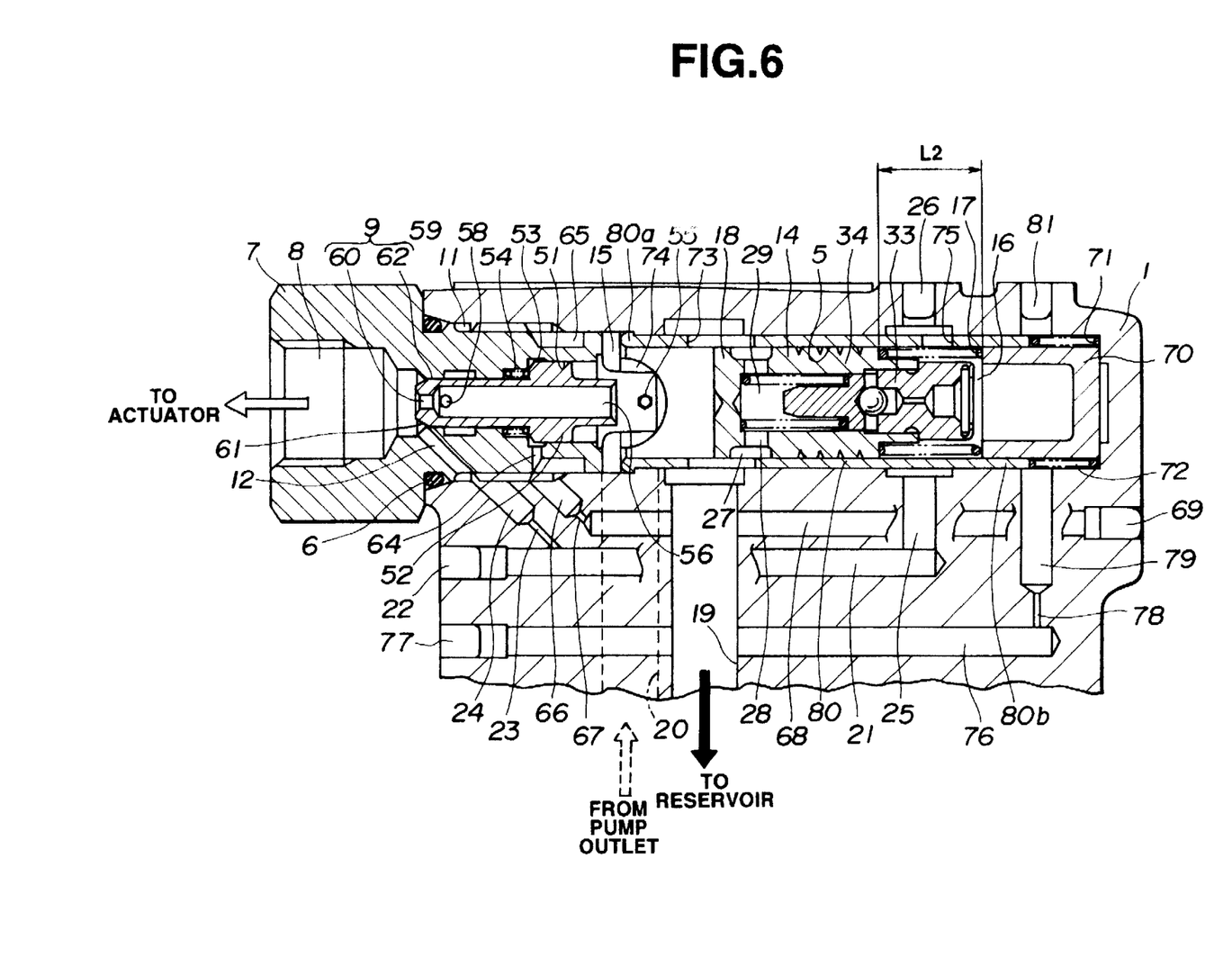
FIG. 6 is a longitudinal cross-sectional view illustrating the flow control valve of the second embodiment under a condition in which the movable sleeve is in close proximity to the second pressure chamber under high pressure in the first pressure chamber.

Referring now to FIGS. 5 and 6, there is shown the fluid-flow control valve device of the second embodiment. The flow control valve device of the second embodiment is similar to that of the first embodiment. Thus, the same reference signs used to designate elements in the valve device of the first embodiment shown in FIGS. 1 and 2 will be applied to the corresponding elements used in the device of the second embodiment shown in FIGS. 5 and 6, for the purpose of comparison of the first and second embodiments. The device of the second embodiment will be hereinafter described in detail with reference to FIGS. 5 and 6, while detailed description of the same elements as incorporated in the device of the first embodiment will be omitted because the above description thereon seems to be self-explanatory.

As previously discussed, in the valve device of the first embodiment, the spring-seat member 37, the return spring 43 put on the member 37 and the control pressure chamber 36 are cooperative with each other to properly control or adjust the set spring-bias (the set spring load) of the control spring 17. On the other hand, in the valve device of the second embodiment, the adjustment of the set spring-load of the control spring 17 is achieved mainly by three elements, namely a movable sleeve 80 which is slidably disposed between the sliding valve spool 14 and the axial bore formed in the housing 1, a low-pressure chamber 72 and a return spring 71 which is attached to one end of the movable sleeve 80 and disposed in the low-pressure chamber 72. Although the device of the first embodiment uses the movable spring seat member 37, the device of the second embodiment uses a stationary spring-seat member 70 upon which one end of the control spring 17 rests. With the use of the movable sleeve 80, the land 18 of the spool 14 allows, stops or properly controls the flow of the working fluid from the first pressure chamber 15 via a radial through-opening 73 bored in the movable sleeve 80 to the drain passage 19. The working-fluid flow discharged from the pump is directed from the inlet passage 20 through a substantially semi-circular opening (cut-out) 74 formed in the movable sleeve 80 into the first pressure chamber 15. As seen in FIGS. 5 and 6, the spring-seat member 70 is provided in the second pressure chamber 16 and is stationary with respect to the housing 1. The substantially cylindrical-hollow movable sleeve 37 is slidably disposed in the axial bore defining a spool chamber. One end (the left-hand end) 80a of the movable sleeve 80 faces to the first pressure chamber 15, while the other end (the right-hand end) 80b of the sleeve 80 faces to the low-pressure chamber 72 which is defined between the outer peripheral wall of the stationary springseat member 70 and the inner peripheral wall of the axial bore of the housing at the second pressure chamber side. The return spring 71 is operably disposed in the low-pressure chamber 72 and attached to the end face of the right-hand end of the sleeve 80, to bias the sleeve 80 towards the first pressure chamber 15 (that is, axially leftwards). The movable sleeve 80 is formed with the radial through-opening 73 communicating the drain port 19, and at the left-hand sleeve end 80a with the substantially semi-circular opening 74 constantly communicating the inlet passage 20, and with a radial through-opening 75 communicating the radial passage 25. The two through-openings 73 and 75 are formed in the cylindrical sleeve body of the sleeve 80, so that the throughopening 73 is brought into alignment with the substantially radially-extending drain passage 19 and the throughopening 75 is brought into alignment with the radial passage 25 when the movable sleeve 80 is held at its leftmost position in which the left end of the sleeve 80 abuts the right end of the connector 7. The passage 76 is also formed in the housing 1 in a manner so as to pass through the drain passage 19. The right end of the passage 76 is a closed end, the left end of the passage 76 is an opening end which is tightly sealed by way of a plug 77. The right end of the passage 76 is communicated with the low-pressure chamber 72 through a pressure-sensitive orifice 78 and a radial passage 79, both formed in the housing. The radial passage 79 is bored in the housing 1 in a manner so as to penetrate through the axial bore (the spool chamber) and the low-pressure chamber 72. The upper opening end of the radial passage 79 is tightly sealed with a plug 81.

As will be fully described later, the device of the second embodiment performs substantially the same flow control operation (see the characteristics of FIGS. 3 and 4) as that of the first embodiment.

In the device of the second embodiment, the pressurized working fluid is introduced from the pump outlet through the inlet passage 20 into the first pressure chamber 15, and then fed through the opening 74, the axial bore 56 of the sub-spool valve 52, and the control orifice 9 into the outlet passage 8. When the power steering unit works normally with the pump running at low speeds, the movable sleeve 80 is held at its leftmost position (the spring-loaded position) by means of the return spring 71 such that the left end 80a of the sleeve 80 abuts the right end of the connector 7, and also the valve spool 14 is forced toward the first pressure chamber 15 by means of the bias of the control spring 17. As a result the through-opening 73, communicating with the drain passage 19, is closed by way of the land 18 and thus almost all the working fluid in the first pressure chamber 15 is fed through the control orifice 9 to the actuator (not shown). Thereafter, as the pump speed increases and thus the amount of the incoming working fluid increases, the pressure drop difference across the control orifice 9 increases. Owing to the increased pressure differential just upstream and downstream of the control orifice 9, the spool 14 shifts in the rightward direction. The rightward movement of the spool 14 permits the control spring 17 to contract to a predetermined length L1 (see FIG. 5) and consequently increases the size of the through-opening 73 and the size of the drain-passage opening. As a consequence, the remainder working fluid is effectively returned through the throughopening 73 and the drain passage 19 to the reservoir. As discussed above, the device of the second embodiment employs the movable sleeve 80 so that the sleeve 80 slidably accommodates therein the sliding spool 14 integrally connected to the pressure relief valve unit 34 and so that the control spring 17 is disposed between the spool 14 and the stationary spring-seat member 70. The movable sleeve 80 is designed so that the left end 80a faces to the first pressure chamber 15 and the right end 80b faces to the low-pressure chamber 72 and so that the right end 80b is engaged with the end of the return spring 71 such as a coiled helical compression spring to normally bias the sleeve 80 towards the first pressure chamber 15. As appreciated, the sleeve 80 is axially balanced between the bias of the return spring 71 and the pressure differential between the pressure applied upon the left-hand annular end face of the sleeve 80 and the pressure applied upon the right-hand annular end face of the sleeve 80. When the pressure in the first pressure chamber 15 is low, the sleeve 80 is stopped by way of the bias of the spring 71 at the leftmost position that the left-hand annular end face of the sleeve 80 abuts the connector 7. Thus, the through-opening 73 is brought into full alignment with the inlet opening of the drain passage 19, while the opening 74 is constantly communicated with the inlet passage 20. Thus, the pressure applied upon the left-hand pressure-receiving surface of the spool 14 becomes low. On the contrary, when the pressure in the first pressure chamber 15 is high, the movable sleeve 80 moves toward the second pressure chamber 16 against the bias of the return spring 71 owing to the high pressure differential between the annular pressure surfaces of both ends of the sleeve 80, until the spring 71 is shifted to the maximum compressed state (see FIG. 6). The maximum rightward movement of the sleeve 80 varies the relative position between the land 18 of the spool 14 and the radial through-opening 73 of the sleeve 80. Actually, when the sleeve is moved to the rightmost position under high pressure, the size of the through-opening 73 is decreased. The decreased size of the through-opening 73 causes the orifice effect, and whereby the pressure applied upon the left-hand flat end face of the spool 14 remarkably rises. This permits the spool 14 to further compress the control spring 17 to a length L2 (see FIG. 6) shorter than the length L1. Finally, the spool 14 is balanced between the pressure in the first pressure chamber 15 (precisely the pressure applied upon the left-hand pressure surface of the spool 14) and the sum of the bias of the control spring 17 and the pressure in the second pressure chamber 16 (precisely the pressure applied upon the right-hand pressure surface of the spool 14). The balanced or controlled axial position of the spool 14 contributes to the desired fluid-flow control operation.

As seen in FIG. 5, when the pressure in the first pressure chamber 15 is low, the movable sleeve 80 is so close to the connector 7 and thus the through-opening 73 is almost aligned with the opening of the drain passage 19. Thus, the pressure in the first pressure chamber 15 becomes almost equal to the pressure in the drain passage 19. The sub-spool valve 52 shifts toward the rightmost position by the bias of the spring 54 as shown in FIG. 5. The size of the opening of the sub-orifice 62 is held essentially at the maximum value. In this case, the size of the opening of the control orifice 9 is held at the maximum, as indicated by the line segment a–b of FIG. 3. That is, when the actuator, into which the working fluid is fed from the outlet passage 8, does not work and thus the pressure in the outlet passage 8 is low, the pump-outlet pressure becomes low, because the pump-outlet pressure is in correlation with the pressure in the outlet passage (e.g., the pressure in the steering-gear high pressure hose connected to the oil inlet of the hydraulic actuator). Thus, the spool 14 is balanced between the spring bias of the control spring 17 of the predetermined setting length L1 and the pressure differential across the control orifice 9. As a consequence, the flow rate of the working fluid passing through the control orifice 9 is controlled according to the flow-rate characteristic illustrated by the line segment A–B of FIG. 4.

When the pressure in the outlet passage 8 rises owing to a rise in the load (a rise in the mechanical-hydraulic resistive force) applied to the hydraulic actuator (the power steering unit), the pump-outlet pressure also becomes risen due to the pressure rise in the high-pressure connection line (e.g., the steering-gear high pressure hose). This results in a rise in the first pressure chamber 15 and forces the movable sleeve 80 to move towards the second pressure chamber 16 against the bias of the control spring 71. The rightward movement of the sleeve 80 reduces the size of the through-opening 73. As a result, the pressure differential across the control orifice 9 increases. The spool 14 functions to maintain the pressure differential across the control orifice 9 constant. The spool 14 is responsive to the change in the pressure differential by utilizing the difference between the pressures applied upon both pressure surfaces of the spool, and is balanced between the bias of the control spring 17 and this pressure difference. Under high pressure, the spool 14 moves rightwards against the bias of the control spring 17, while compressing the spring 17. At the same time, the sub-spool valve 52 axially shifts leftwards against the bias of the spring 54. The axially leftward movement of the sub-spool valve 52 gradually reduces the size of the sub-orifice opening to essentially linearly increase the effect of the variable sub-orifice 62. In this manner, the size of the control-orifice opening is gradually reduced to the minimum, as illustrated by the line segment b–c of FIG. 3. In this transient shifting state of the sub-spool valve 52, the spool 14 is controlled depending on the a somewhat greater spring bias of the control spring 17 and the pressure differential across the control orifice 9, with the result that the flow rate of the working fluid passing through the orifice 9 changes in accordance with the line segment B–C of FIG. 4. Thereafter, immediately when the pressure in the outlet passage 8 reaches the predetermined point and thus the pressure in the first pressure chamber 15 reaches the predetermined pressure level, the movable sleeve 80 shifts to the rightmost position at which the return spring 71 such as a coiled helical compression spring is in the maximum compressed state (see FIG. 6). With the pump-outlet pressure greater than the predetermined point, the sub-orifice opening is fully closed and thus the opening size of the control orifice 9 actually becomes equal to the opening size of the main orifice 60. That is, the size of the control-orifice opening becomes reduced to the minimum size, as indicated by the line segment c–d of FIG. 3. Therefore, under the pressure in the outlet passage 8 higher than the predetermined point, the spool 14 performs the fluid-flow control operation in response to both the pressure differential across the control orifice 9 adjusted to the minimum opening size and the bias of the control spring 17 whose set pressure is maintained at the great set value. Under such high pressure in the outlet passage 8, the flow rate of the working fluid flowing through the control orifice 9 is kept at the predetermined second flow rate (corresponding to the maximum flow rate of working fluid fed into the inlet of the actuator) as indicated by the line segment C–D of FIG. 4.

When the hydraulic actuator (the power steering unit) does not work with the steering wheel in neutral, the pressure in the outlet passage 8 drops and thus the pressure in the second pressure chamber 16 also drops. As a result, the spool 14 shifts towards the second pressure chamber 16 against the bias of the control spring 17 to maintain the pressure differential across the control orifice 9. The axially rightward movement of the spool 14 increases the size of the through-opening 73. This directs a large amount of the working fluid in the first pressure chamber 15 via the through-opening of the increased opening size to the drain passage 19. As a consequence, the pump-outlet pressure is effectively rapidly lowered and thus the workload of the pump can be effectively reduced. At the same time, in the event that the pressure in the outlet passage 8 is lowered with the actuator in inoperative state and thus the spool 14 operates to increase the size of the through-opening 73 communicating the drain passage 19, the pressure in the first pressure chamber 15 is necessarily lowered. The pressure drop in the first pressure chamber 15 produces the leftward movement of the movable sleeve 80 by virtue of the bias of the spring 71. Then, the spool 14 is balanced between the bias of the control spring 17 and the pressure differential across the control orifice 9 (the pressure difference between the pressures in the first and second pressure chambers). At the balanced position of the spool 14, the leftward displacement of the movable sleeve 80 results in the slight change of the relative position of the through-opening 73 with respect to the spool 14. This further increases the opening area of the through-opening 73. In this manner, when the hydraulic actuator does not work and little or no flow rate of working fluid is required, the working fluid introduced into the first pressure chamber 15 is smoothly returned through the through-opening 73 of the fully increased opening area (almost no restriction) via the drain passage 19 to the reservoir. This results in a smooth pressure drop in the outlet port side of the pump and effectively reduces the workload of the pump and achieves satisfactory energy saving. As explained above, in case of the flow control valve device of the second embodiment, the movable sleeve 80 is balanced between the bias of the return spring 71 and the pressure in the first pressure chamber 15. The axial movement of the sleeve 80 varies the relative position of the return through-opening 73 with respect to the spool 14 to control or adjust the size of the return-passage opening. The flow control valve device of the second embodiment is designed so that a portion of the working fluid discharged from the pump never passes through the control orifice 9 for the axial movement of the movable sleeve 80, associated with the spool 14 via the variable through-opening 73. Accordingly, the discharge pressure of the pump can be set at a relatively low level as compared with the prior art, thus suppressing wasteful energy consumption of the pump and ensures satisfactory energy saving. In the second embodiment, although the stationary spring-seat member 70 is produced as a component part separated from the valve housing 1, it will be appreciated that the spring-seat member 70 may be formed integral with the housing 1.

Third Embodiment

Figure 7:
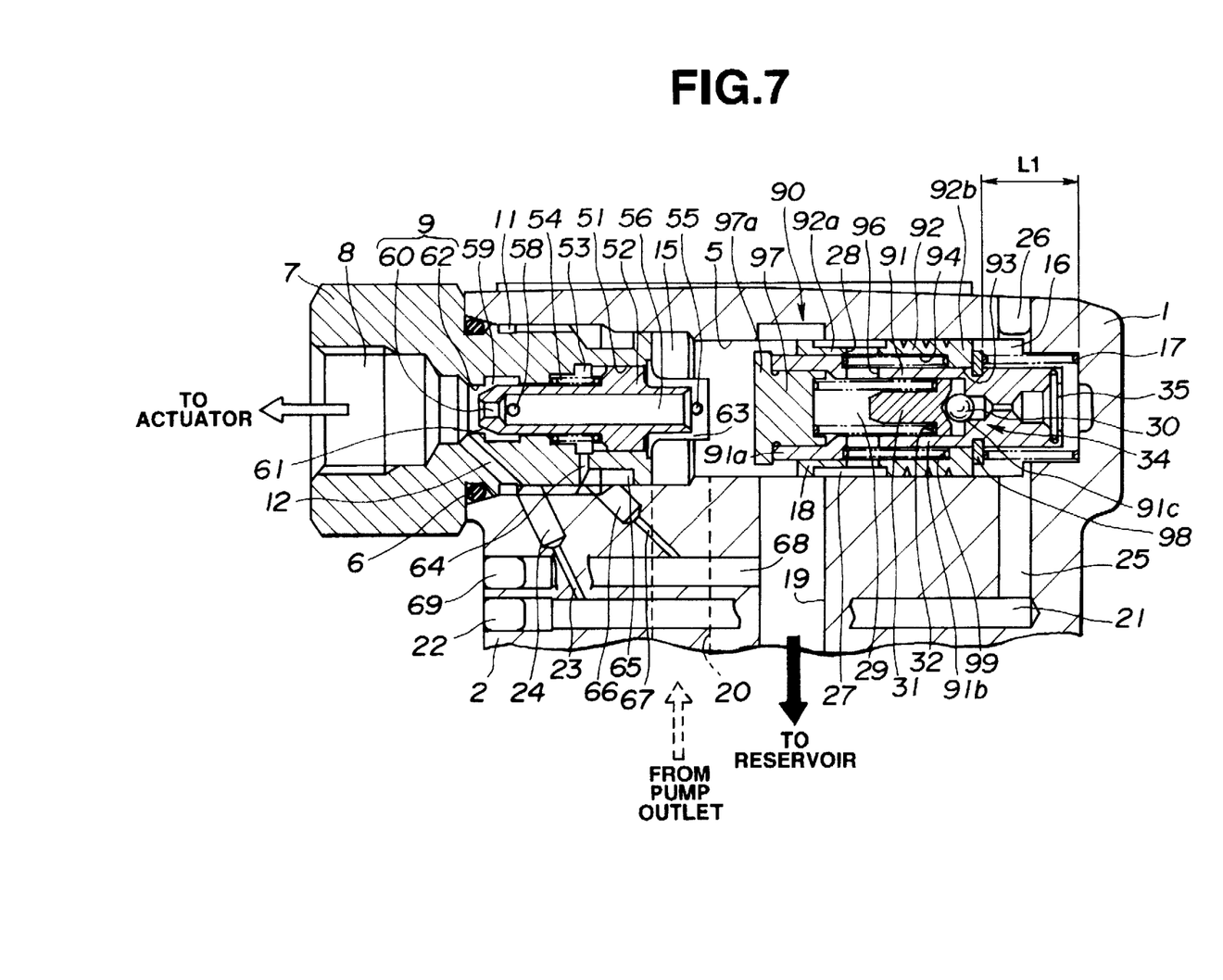
FIG. 7 is a longitudinal cross-sectional view illustrating a third embodiment of the flow control valve device of the invention.
Figure 8:
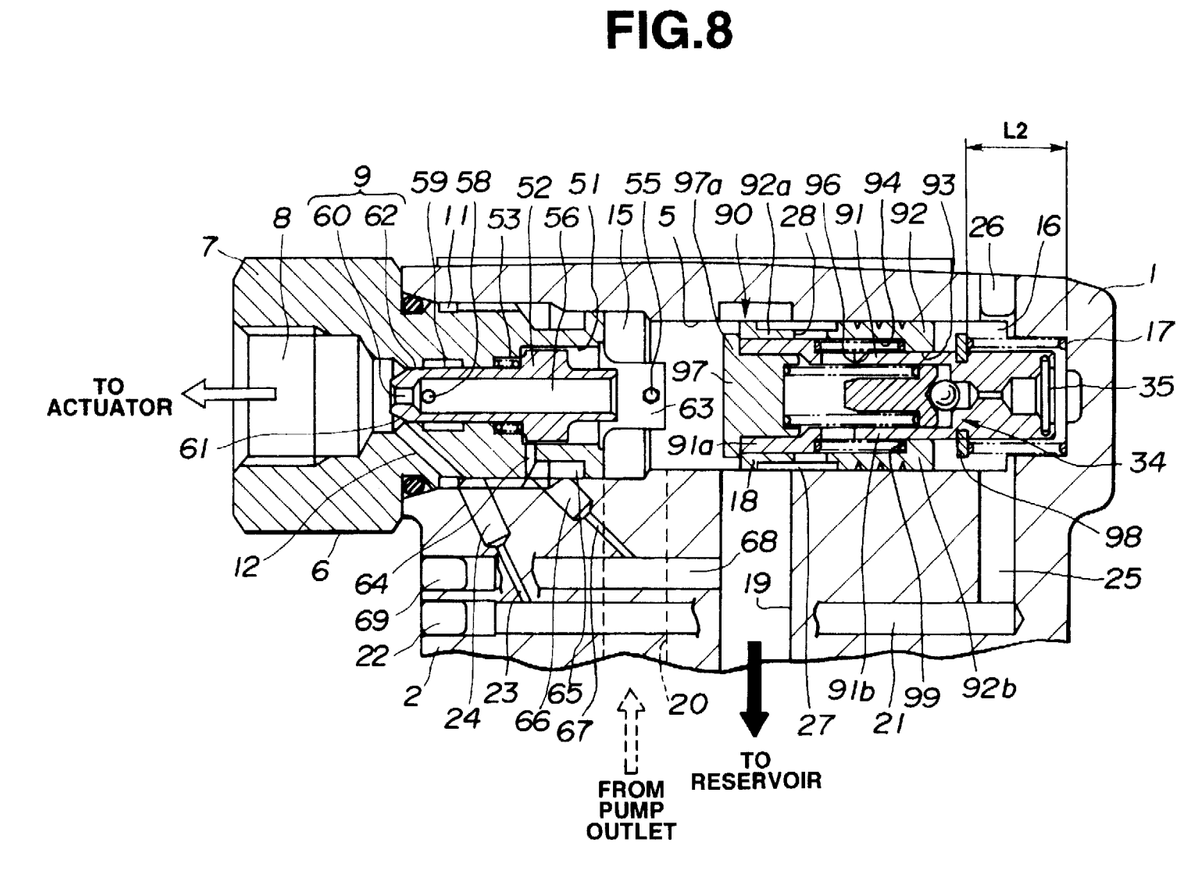
FIG. 8 is a longitudinal cross-sectional view illustrating the flow control valve of the third embodiment under a condition in which the outside spool is in close proximity to the first pressure chamber under high pressure of both the first and second pressure chambers.

Referring now to FIGS. 7 and 8, there is shown the fluid-flow control valve device of the third embodiment. The flow control valve device of the third embodiment is similar to that of the first embodiment. Thus, the same reference signs used to designate elements in the valve device of the first embodiment shown in FIGS. 1 and 2 will be applied to the corresponding elements used in the device of the third embodiment shown in FIGS. 7 and 8, for the purpose of comparison of the first and third embodiments. Briefly speaking, the valve device of the third embodiment is different from that of the first embodiment in that the sliding spool-type valve 90 employed in the device of the third embodiment is comprised of an inner spool 91 and an outer spool 92. As seen in FIG. 7, the spool 90 is slidably accommodated in the spool chamber 5 to define the first and second pressure chambers 15 and 16. The land 8 (exactly the left-hand land section of the outer spool 92) allows, stops or properly controls the flow of the working fluid from the first pressure chamber 15 to the drain passage 19. The outer spool 92 has a cylindrical portion 92a and a substantially cylindrical bottom portion 92b being formed with an axial through-opening 93. The essentially annular pressure-receiving surface (the right-hand end face) of the bottom portion 92b is formed somewhat greater than the pressure-receiving surface (the left-hand end face) of the cylindrical portion 92a. The inner spool 91 has a large-diameter portion 91a and a small-diameter portion 91b. The large-diameter portion 91a is slidably fitted into the cylindrical portion 92a of the outer spool, whereas the small-diameter portion 92b is slidably fitted into the axial through-opening 93. The cylindrical portion 92a of the outer spool 92 faces to the first pressure chamber 15, while the bottom portion 92b faces to the second pressure chamber 16. The outer spool 92 is formed with the annular groove 27 and the radial through-opening 28 opening to the bottom of the annular groove 27. A low-pressure chamber 94 is defined between the inner peripheral wall of the cylindrical portion 92a of the outer spool 92 and the outer peripheral wall of the small-diameter portion 91b of the inner spool 91, in such a manner as to communicate with the drain passage 19 through the radial through-opening 28. The inner spool 91 is formed with a radial through-opening 96 communicating the low-pressure chamber 94. The inner spool 91 is formed with the axially-extending stepped bore 29 communicating the radial through-opening 96. The left-hand opening end of the axial stepped bore 29 is tightly sealed with a plug 97. The inner spool 91 is equipped with the pressure relief valve 34. Reference sign 91c denotes a ball-valve seat. A spring-seat member 98 is attached onto the outer periphery of the inner spool 91 in order to support the control spring 17. The spring-seat member 98 also serves as a stopper member which limits or restricts the maximum leftward movement of the outer spool 92. A spring 99 such as a coiled helical compression spring is operably disposed in the low-pressure chamber 94 to bias the inner spool 91 toward the first pressure chamber 15 and simultaneously to bias the outer spool 92 toward the second pressure chamber 16 (or the spring-seat member 98). The leftward relative displacement of the outer spool 92 is restricted by the flanged potion 97a of the plug 97 fixed to the inner spool 91.

In the same manner as the device of the first embodiment, the pressurized working fluid is introduced from the pump outlet through the inlet passage 20, the first pressure chamber 15, the cut-out 63 of the connector 7, the axial bore 56 of the sub-spool valve 52, and the control orifice 9 into the outlet passage 8. When the power steering unit works normally with the pump running at low speeds, the outer spool 92 is biased towards the first pressure chamber 15 with the bottom portion 92b being in abutment with the spring-seat member 98. As a consequence, the spool sub-assembly 90 is forced toward the first pressure chamber 15 by the bias of the control spring 17, thus fully closing the opening of the drain passage 19 through the cylindrical portion (involving the land 18) of the outer spool 92. Under these conditions, almost all the working fluid in the first pressure chamber 15 is fed through the control orifice 9 to the actuator (not shown). Thereafter, as the pump speed increases and thus the amount of the incoming working fluid increases, the pressure drop difference across the control orifice 9 increases. Due to the increased pressure drop across the control orifice 9, the spool 90 moves rightwards, as shown in FIG. 7. The rightward movement of the spool 90 permits the control spring 17 to contract to a predetermined length L1 (see FIG. 7), and as a result the remainder working fluid is effectively returned through the drain passage 19 of the increased return-passage opening size to the reservoir. As explained above, the device of the third embodiment, employs the sliding spool sub-assembly 90 composed of the inner and outer spools 91 and 92 being slidably fitted with each other. Also provided is the spring 99 disposed between the inner and outer spools 91 and 92 to bias the inner spool 91 toward the first pressure chamber 15 and to bias the outer spool 92 toward the second pressure chamber 16. Therefore, when the pressure in the first pressure chamber and the pressure in the second pressure chamber are both low, the outer spool 92 is biased towards the second pressure chamber 16 by means of the bias of the spring 99 and thus held in the spring-biased position in which the bottom portion 92b abuts the spring-seat member 98. Under this condition, the outer spool 92 axially moves together with the inner spool 91. The spool sub-assembly 90 is balanced between the bias of the control spring 17 and the pressure differential across the control orifice 9, so that the length of the control spring 17 becomes equal to the predetermined setting length L1 (see FIG. 7). On the other hand, under the low pressure in the first pressure chamber 15, the size of the opening of the control orifice 9 is held at the maximum, as indicated by the line segment a–b of FIG. 3. As a consequence, the flow rate of the working fluid passing through the control orifice 9 is controlled according to the flow-rate characteristic illustrated by the line segment A–B of FIG. 4. On the contrary, when the pressure in the pressure in the first pressure chamber 15 and the pressure in the second pressure chamber 16 are both high, the outer spool 92 moves toward the first pressure chamber 15 against the bias of the spring 99 by virtue of the pressure in the second pressure chamber 16 until the outer spool 92 arrives at the maximum leftward displacement position in which the left end of the cylindrical portion 92a abuts the flanged portion 97a of the plug 97 fixed to the inner spool 91 (see FIG. 8). The leftward displacement of the outer spool 92 relative to the inner spool 91, causes the relative position between the land 18 of the spool sub-assembly 90 and the opening of the drain passage 19 to change. Actually, the size of the drain-passage opening is further reduced, and thus the control spring 17 is further contracted until the length of the control spring 17 reaches a length L2 (see FIG. 8) shorter than the length L1. The spool sub-assembly 90 is balanced between a first sum (that is, the sum of the bias of the control spring 17 and the pressure prevailing in the second pressure chamber 16 and applied upon the right-hand pressure surface of the spool 90) and a second sum (that is, the sum of the bias of the spring 99 and the pressure prevailing in the first pressure chamber 15 and applied upon the left-hand pressure surface of the spool 90). The balanced or controlled axial position of the spool 90 contributes to the desired fluid-flow control operation. When the pressure in the outlet passage 8 rises gradually owing to the rise in the load applied o the hydraulic actuator (the power steering unit), this causes the pressure in the first pressure chamber 15 to rise. As a consequence, the pressure in the second pressure chamber 16 also rises. Under these conditions, the outer spool 92 moves toward the first spool chamber against the bias of the spring 99, and thus the size of the drain-passage opening is reduced gradually. As a result, the pressure differential across the control orifice 9 is gradually reduced, as appreciated from the characteristic indicated by the line segment b–c of FIG. 3. To compensate for the increased pressure differential and to regulate the pressure differential across the control orifice 9 constant, the spool sub-assembly 90 begins to move toward the second pressure chamber 16 against the bias of the control spring 17. The spool sub-assembly 90 performs the flow control operation in the proper balanced position that the pressure differential across the control orifice 9, the bias of the spring 99 and the bias of the control spring 17 are balanced to each other. In accordance with the rise in the pressure in the outlet passage 8, the opening area of the control orifice 9 varies according to the characteristic indicated by the line segment b–c of FIG. 3. Under the pressure-rise, the axial movement of the spool 90 is controlled depending on the somewhat greater bias of the control spring 17 and the pressure differential across the control orifice whose opening size decreases gradually. In this transient shifting state of the sub-spool valve 52, the flow rate of the working flow passing through the control orifice 9 is controlled according to the characteristic indicated by the line segment B–C of FIG. 4. Then, as soon as the pressure in the outlet passage 8 reaches the predetermined point and thus the pressure levels of the first and second pressure chambers 15 and 16 reach the predetermined pressure level, the outer spool 92 is held at its maximum relative displacement position with respect to the inner spool 91 with the spring 99 in the maximum compressed state (FIG. 8). Under this condition, the inner and outer spools 91 and 92 moves together with each other, with the outer spool 92 held at the maximum relative displacement position. The control orifice 9 is maintained at the minimum opening size, as indicated by the line segment c–d of FIG. 3. From the mutual relation among the high pressure in the first pressure chamber, the axial position of the outer spool 92 with the land 18, and the pressure differential across the control orifice 9, the flow rate of the working fluid passing through the control orifice 9 is controlled according to the characteristic indicated by the line segment C–D of FIG. 4. Usually when the hydraulic actuator works, that is the handling of the steering wheel repeatedly performs, the output flow rate from the control valve device of the embodiments is adjusted to the flow-rate characteristic of C–D of FIG. 4. When the hydraulic actuator does not work for example with the steering wheel in neutral, the pressure in the outlet passage 8 drops and thus the pressure differential across the orifice 9 varies and the pressure in the second pressure chamber 16 drops rapidly. To compensate for the pressure differential across the orifice 9, and owing to the pressure drop in the second pressure chamber 16 communicating the outlet passage 8, the spool 90 moves toward the second pressure chamber 16 against the bias of the control spring 17. The axially rightward movement of the spool 90 increases the size of the drain-passage opening to direct a large amount of the working fluid in the first pressure chamber 15 via the drain passage 19 to the reservoir. As a consequence, the pump-outlet pressure is effectively rapidly lowered and thus the workload of the pump can be effectively reduced. At the same time, the outer spool 92 shifts toward the second pressure chamber 16 by virtue of the bias of the spring 99, owing to the pressure drop in the second pressure chamber 16 based on the pressure drop in the outlet passage 8. The, the rightward movement of the outer spool 92 is stopped by abutment between the annular bottom portion 92a and the spring-seat member 98. Then, the spool 90 is balanced between the bias of the control spring 17 and the pressure differential across the control orifice 9. At the balanced position of the spool 90, the rightward displacement of the outer spool 92 results in a more increased size of the drain-passage opening. In this manner, when the hydraulic actuator does not work and little or no flow rate of working fluid is required, the working fluid introduced into the first pressure chamber 15 is smoothly returned through the drain passage 19 of the fully increased opening area (almost no restriction) to the reservoir. This results in a smooth pressure drop in the outlet port side of the pump and effectively reduces the workload of the pump and achieves satisfactory energy saving. In case of the flow control valve device of the third embodiment, the outer spool 92 is balanced between the bias of the return spring 99 attached to the outer spool, the pressure (the pressure in the second pressure chamber 16) applied upon the right-hand pressure-receiving surface of the annular bottom portion 92b, and the pressure (the pressure in the first pressure chamber 15) applied upon the left-hand pressure-receiving surface of the cylindrical portion 92a, to vary the size of the drain-passage opening. In the same manner as the first and second embodiments, when the actuator is shifted the inoperative state, the device of the third embodiment operates to rapidly smoothly return the remainder working fluid in the first pressure chamber 15 to the reservoir without undesired orifice constriction. Accordingly, the discharge pressure of the pump can be set at a relatively low level as compared with the prior art, thus suppressing wasteful energy consumption of the pump and ensures satisfactory energy saving. In the third embodiment, since the spool sub-assembly 90 consists inner and outer spools 91 and 92 which are coaxially slidably fitted to each other, the valve housing 1 and the flow control valve assembly can be small-sized in radial cross-section. Although the biasing element, i.e., the return spring 99 is disposed in the low-pressure chamber 94 defined between the first and second spools 91 and 92, to provide the same biasing effect, this spring may be disposed between the left-hand end of the cylindrical portion 92a of the outer spool 92 and the flanged portion 97a fixed to the inner spool side.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fluid-flow control valve device comprising:

a spool chamber;

an outlet passage being adapted to fluidly connected to an inlet port of an hydraulic actuator;

an inlet passage being adapted to fluidly connected to a pump outlet;

a drain passage being adapted to be fluidly connected to a reservoir;

a control orifice being fluidly disposed upstream of said outlet passage for variably restricting a flow of working fluid from said inlet passage to said outlet passage;

a valve spool slidably accommodated in said spool chamber and defining a first-pressure chamber and a second pressure chamber in cooperation with an inner peripheral wall of said spool chamber; said first pressure chamber to which said inlet passage and said drain passage open to communicate said inlet passage with said outlet passage via said control orifice and to control a size of drain-passage opening in conjunction with one end of said valve spool; and said second pressure chamber into which a pressure in said outlet passage is introduced;

a control spring disposed in said second pressure chamber for biasing said valve spool toward said first pressure chamber; said control spring being in cooperation with said valve spool and said control orifice, to feed a required flow rate of working fluid from said inlet passage via said control orifice to said outlet passage and to return a remainder working fluid to said drain passage;

said control orifice consisting of a main fixed orifice and a sub-orifice being arranged parallel to said main fixed orifice, said sub-orifice being responsive to a pressure in said first pressure chamber to variably meter an opening size of said sub-orifice; and spring-bias adjustment means for variably adjusting a set spring-bias of said control spring associated said valve spool in response to a change in the pressure in said outlet passage.

2. A fluid-flow control valve device as claimed in claim 1, wherein said spring-bias adjustment means comprises at least an axially-movable spool type member and a return spring attached to said axially-movable spool type member.

3. A fluid-flow control valve device as claimed in claim 1, wherein said sub-orifice comprises a sub-spool valve being responsive to a pressure differential between the pressure in said inlet passage and the pressure in said drain passage, for varying a size of an opening of said sub-spool valve.

4. A fluid-flow control valve device as claimed in claim 1, wherein said spring-bias adjustment means comprises a control pressure chamber communicating said second pressure chamber, a movable spring-seat member disposed between said control pressure chamber and said second pressure chamber so that a first pressure surface of said movable spring-seat member facing said second pressure and so that a second pressure surface of said movable spring-seat member facing said control pressure chamber having a pressure-receiving surface area greater than said first pressure surface, and a return spring attached to said movable spring-seat member for biasing said movable spring-seat member toward said control pressure chamber.

5. A fluid-flow control valve device as claimed in claim 1, wherein said spring-bias adjustment means comprises an essentially cylindrical-hollow movable sleeve slidably disposed between an outer periphery of said valve spool and an inner peripheral wall of said spool chamber and having a through-opening for communicating the opening of said inlet passage with the opening of said drain passage, a first pressure surface of said movable sleeve facing to said first pressure chamber and a second pressure surface of said movable sleeve facing to a low-pressure chamber formed opposite to said first pressure chamber, and a return spring attached to said movable sleeve for biasing said movable sleeve toward said first pressure chamber.

6. A fluid-flow control valve device as claimed in claim 1, wherein said valve spool comprises an outer spool having a cylindrical portion and a bottom portion formed with an axial through-opening and an inner spool having a large-diameter portion slidably fitted onto an inner peripheral wall of said cylindrical portion of said outer spool and a small-diameter portion slidably fitted into said axial through-opening, said bottom portion of said outer spool facing to said second pressure chamber, and said control spring acting on said inner spool, and wherein said spring-bias adjustment means comprises at least a low-pressure chamber being defined between an inner peripheral wall of said cylindrical portion of said outer spool and an outer peripheral wall of said small-diameter portion of said inner spool, and a return spring disposed between said inner and outer spools for biasing said inner spool toward said first pressure chamber and biasing said outer spool toward said second pressure chamber.

7. A fluid-flow control valve device as claimed in claim 6, wherein said return spring, disposed between said inner and outer spool chambers, is accommodated in said low-pressure chamber.

8. A fluid-flow control valve device comprising:

a spool chamber;

an outlet passage being adapted to fluidly connected to an inlet port of an hydraulic actuator;

an inlet passage being adapted to fluidly connected to a pump outlet;

a drain passage being adapted to be fluidly connected to a reservoir;

a control orifice being fluidly disposed upstream of said outlet passage for variably restricting a flow of working fluid from said inlet passage to said outlet passage;

a valve spool slidably accommodated in said spool chamber and defining a first pressure chamber and a second pressure chamber in cooperation with an inner peripheral wall of said spool chamber; said first pressure chamber to which said inlet passage and said drain passage open to communicate said inlet passage with said outlet passage via said control orifice and to control a size of drain-passage opening in conjunction with one end of said valve spool; and said second pressure chamber into which a pressure in said outlet passage is introduced;

a control spring disposed in said second pressure chamber for biasing said valve spool toward said first pressure chamber; said control spring being in cooperation with said valve spool and said control orifice, to feed a required flow rate of working fluid from said inlet passage via said control orifice to said outlet passage and to return a remainder working fluid to said drain passage;

said control orifice consisting of a main fixed orifice and a sub-orifice being arranged parallel to said main fixed orifice, said sub-orifice being responsive to a pressure in said first pressure chamber to variably meter an opening size of said sub-orifice; and means for variably adjusting a set spring-bias of said control spring associated said valve spool in response to a change in the pressure in said outlet passage, wherein said spring-bias adjustment means comprises a control pressure chamber communicating said second pressure chamber, a movable spring-seat member disposed between said control pressure chamber and said second pressure chamber so that a first pressure surface of said movable spring-seat member facing said second pressure and so that a second pressure surface of said movable spring-seat member facing said control pressure chamber having a pressure-receiving surface area greater than said first pressure surface, and a return spring attached to said movable spring-seat member for biasing said movable spring-seat member toward said control pressure chamber.

9. A fluid-flow control valve device comprising:

a spool chamber;

an outlet passage being adapted to fluidly connected to an inlet port of an hydraulic actuator;

an inlet passage being adapted to fluidly connected to a pump outlet;

a drain passage being adapted to be fluidly connected to a reservoir;

a control orifice being fluidly disposed upstream of said outlet passage for variably restricting a flow of working fluid from said inlet passage to said outlet passage;

a valve spool slidably accommodated in said spool chamber and defining a first pressure chamber and a second pressure chamber in cooperation with an inner peripheral wall of said spool chamber; said first pressure chamber to which said inlet passage and said drain passage open to communicate said inlet passage with said outlet passage via said control orifice and to control a size of drain-passage opening in conjunction with one end of said valve spool; and said second pressure chamber into which a pressure in said outlet passage is introduced;

a control spring disposed in said second pressure chamber for biasing said valve spool toward said first pressure chamber; said control spring being in cooperation with said valve spool and said control orifice, to feed a required flow rate of working fluid from said inlet passage via said control orifice to said outlet passage and to return a remainder working fluid to said drain passage;

said control orifice consisting of a main fixed orifice and a sub-orifice being arranged parallel to said main fixed orifice, said sub-orifice being responsive to a pressure in said first pressure chamber to variably meter an opening size of said sub-orifice; and means for variably adjusting a set spring-bias of said control spring associated said valve spool in response to a change in the pressure in said outlet passage, wherein said spring-bias adjustment means comprises an essentially cylindrical-hollow movable sleeve slidable disposed between an outer periphery of said valve spool and an inner peripheral wall of said spool chamber and having a through-opening for communicating the opening of said inlet passage with the opening of said drain passage, a first pressure surface of said movable sleeve facing to said first pressure chamber and a second pressure surface of said movable sleeve facing to a low-pressure chamber formed opposite to said first pressure chamber, and a return spring attached to said movable sleeve for biasing said movable sleeve toward said first pressure chamber.

10. A fluid-flow control valve device comprising:

a spool chamber;

an outlet passage being adapted to fluidly connected to an inlet port of an hydraulic actuator;

an inlet passage being adapted to fluidly connected to a pump outlet;

a drain passage being adapted to be fluidly connected to a reservoir;

a control orifice being fluidly disposed upstream of said outlet passage for variably restricting a flow of working fluid from said inlet passage to said outlet passage;

a valve spool slidably accommodated in said spool chamber and defining a first pressure chamber and a second pressure chamber in cooperation with an inner peripheral wall of said spool chamber; said first pressure chamber to which said inlet passage and said drain passage open to communicate said inlet passage with said outlet passage via said control orifice and to control a size of drain-passage opening in conjunction with one end of said valve spool; and said second pressure chamber into which a pressure in said outlet passage is introduced;

a control spring disposed in said second pressure chamber for biasing said valve spool toward said first pressure chamber; said control spring being in cooperation with said valve spool and said control orifice, to feed a required flow rate of working fluid from said inlet passage via said control orifice to said outlet passage and to return a remainder working fluid to said drain passage;

said control orifice consisting of a main fixed orifice and a sub-orifice being arranged parallel to said main fixed orifice, said sub-orifice being responsive to a pressure in said first pressure chamber to variably meter an opening size of said sub-orifice; and means for variably adjusting a set spring-bias of said control spring associated said valve spool in response to a change in the pressure in said outlet passage, wherein said valve spool comprises an outer spool having a cylindrical portion and a bottom portion formed with an axial through-opening and an inner spool having a large-diameter portion slidably fitted onto an inner peripheral wall of said cylindrical portion of said outer spool and a small-diameter portion slidably fitted into said axial through-opening, said bottom portion of said outer spool facing to said second pressure chamber, and said control spring acting on said inner spool, and wherein said spring-bias adjustment means comprises at least a low-pressure chamber being defined between an inner peripheral wall of said cylindrical portion of said outer spool and an outer peripheral wall of said small-diameter portion of said inner spool, and a return spring disposed between said inner and outer spools for biasing said inner spool toward said first pressure chamber and biasing said outer spool toward said second pressure chamber.

* * * * *